(12) United States Patent
Khabasheshku et al.

(10) Patent No.: US 7,476,769 B1
(45) Date of Patent: Jan. 13, 2009

(54) PRODUCTION OF HYDROPEROXIZED FUNCTIONALIZED OLEFINIC COMPOUNDS

(75) Inventors: Olga Khabasheshku, Houston, TX (US); Jason Clark, Houston, TX (US); Steve Harden, Pasadena, TX (US); Steven Gray, Bellaire, TX (US); Vance Stevens, Deer Park, TX (US); Carlos Corleto, Seabrook, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 11/983,685

(22) Filed: Nov. 9, 2007

(51) Int. Cl.
*C07C 409/02* (2006.01)
*C08J 3/28* (2006.01)

(52) U.S. Cl. ............... 568/573; 522/149; 522/150

(58) Field of Classification Search ........... 568/573; 522/149, 150
See application file for complete search history.

(56) References Cited

U.S. PATENT DOCUMENTS

| | | | |
|---|---|---|---|
| 3,484,353 A * | 12/1969 | Sharp | 522/85 |
| 3,846,266 A * | 11/1974 | Duynstee et al. | 522/129 |
| 4,717,741 A | 1/1988 | Hahnfeld et al. | |
| 5,075,347 A | 12/1991 | Platt et al. | |
| 5,861,455 A | 1/1999 | Reddy et al. | |
| 5,959,033 A | 9/1999 | Demirors et al. | |
| 6,143,833 A | 11/2000 | Klussmann et al. | |
| 6,242,532 B1 | 6/2001 | Baumgartner et al. | |
| 6,489,378 B1 | 12/2002 | Sosa et al. | |
| 6,703,460 B1 | 3/2004 | Blackmon et al. | |
| 6,972,311 B2 | 12/2005 | Chevillard et al. | |
| 7,141,615 B2 | 11/2006 | Scranton | |
| 2006/0276561 A1 | 12/2006 | Reimers et al. | |

\* cited by examiner

*Primary Examiner*—Sikarl A Witherspoon
(74) *Attorney, Agent, or Firm*—William D. Jackson

(57) ABSTRACT

Process for the preparation of a hydroperoxide functionalized olefinic compound in an oxidation reactor containing a particulate catalyst bed comprising a light induced photosensitized catalyst component supported on a particulate substrate material forming a permeable catalyst bed. The photoenergized catalyst component is a photoreductant material which is effective for the conversion of triplet oxygen to singlet oxygen under illumination with ultraviolet or visible light. An oxygen containing feed stream containing triplet oxygen is supplied to the catalyst bed. The catalyst bed is irradiated at an intensity to convert triplet oxygen to singlet oxygen to produce a singlet oxygen enriched gas stream. The enriched gas stream is supplied to a second reactor which contains a dispersion of an olefinic component having an allylic hydrogen which is contacted with the enriched gas stream under conditions effective to cause an allylic rearrangement and introduce hydroperoxide functionalization into the olefinic component.

25 Claims, 2 Drawing Sheets

PRODUCTION OF HYDROPEROXIZED FUNCTIONALIZED OLEFINIC COMPOUNDS

FIELD OF THE INVENTION

This invention relates to the preparation of hydroperoxide functionalized olefinic compounds, and more particularly, to the formation of hydroperoxide functional sites on olefinic molecules through the conversion of triplet state oxygen to singlet state oxygen and employing the resulting singlet oxygen to produce hydroperoxide functionalized molecules in a heterogeneous reaction mode.

BACKGROUND OF THE INVENTION

Light-induced photoreductants can be employed to excite triplet state oxygen to singlet state oxygen which can be employed in the formation of hydroperoxide sites such as those employed to functionalize the initiation of polymerization reactions. Olefinic compounds such as aliphatic dienes or cyclodienes, such as cyclopentadiene, can be photo oxidized through the selective application of singlet state oxygen to produce desired end products. A particular application of the conversion of triplet state oxygen to singlet state oxygen is in the production of rubbery polymers.

Singlet state oxygen can be reacted with unsaturated polymeric rubbers, such as diene rubber compounds, to form the corresponding hydroperoxide functionalized rubbers. The hydroperoxide functionalized sites on the rubber backbone provide reactive sites which enhance the grafting efficiency in the reaction of the rubbery polymer with monomers which form pendant groups on polymeric backbones. The grafting efficiency for a particular monomer-polymer system is thus a function of the number of peroxide groups formed on each molecule of the rubbery polymer. In homogeneous reaction modes, conversion of triplet state oxygen to singlet state oxygen is accomplished in the presence of a mixture of the rubber polymer and an oxygen containing gas such as air. All things being equal, the number of pendant groups formed on the polymer backbone increases with the efficiency of the photoreductant in exciting the triplet state oxygen to a singlet state in a dispersion of the rubber in a suitable solvent such as styrene.

Suitable photoreductant formulations for the production of hydroperoxide derivatives of rubber by the reduction of triplet state oxygen to singlet state oxygen involve the application of light energy to rubber solutions of various photosensitizing agents such as methylene blue, rose bengal, and others. These agents are dissolved in a solution of a rubbery polymer through the use of an alcohol-based solubilizer such as methanol, which enhances the solubility of the photosensitizing agent in the rubber solution. The rubbery solution containing the photosynthesizing agent is oxygenated and then subjected to irradiation with light energy to convert triplet oxygen to singlet oxygen for use in the polymerization of the rubber-containing solution.

SUMMARY OF THE INVENTION

In accordance with the present invention, there is provided a process for the preparation of a hydroperoxide functionalized olefinic compound which can include but is not limited to a rubber compound. In carrying out the invention there is provided an oxidation reactor containing a particulate catalyst bed. The catalyst bed comprises a light induced photosensitized catalyst component supported on a particulate substrate material forming a permeable catalyst bed. The photoenergized catalyst component is a photoreductant material which is effective for the conversion of triplet oxygen to singlet oxygen under illumination with ultraviolet or visible light. An oxygen containing feed stream containing triplet oxygen is supplied to the catalyst bed. The catalyst bed is irradiated with electromagnetic radiation and the ultra-violet or visible light range at an intensity to convert triplet oxygen to singlet oxygen in order to produce a singlet oxygen enriched gas stream. In one embodiment of the invention, the catalyst bed is irradiated with electromagnetic radiation having a wavelength predominantly within the 350-800 nanometers region. The catalyst bed is irradiated with an illumination intensity within the range of 10-150 foot candles and, more specifically, within the range of 30-80 foot candles. The singlet oxygen enriched gas stream is supplied to a second reactor which contains a dispersion of an olefinic component having an allylic hydrogen. The olefinic component is dispersed in a carrier solvent and the dispersion is contacted with the singlet oxygen enriched gas stream in a heterogeneous reaction mode under conditions effective to cause an allylic rearrangement and introduce hydroperoxide functionalization into the olefinic component. The hydroperoxide functionalized olefinic compound component is recovered from the second reactor for further processing.

In one mode of operation, the singlet oxygen enriched gas is introduced into the dispersion by means of gas diffuser immersed in the dispersion within the second reactor. One embodiment of the invention involves the use of an elongated column having a plurality of spaced catalyst sections of particulate substrate material containing the catalyst component which alternate with a plurality of sections of light transparent particles interposed between the catalyst sections. The oxidation reactor may comprise a plurality of elongated columns arranged in parallel. Each column comprises a gas permeable catalyst bed formed with a light induced photoenergized catalyst component. A gas diffuser is associated with each of the columns. Thus, the output from each column is supplied through its corresponding gas diffuser into the dispersion of olefinic compound.

A further application of the present invention involves the preparation of a hydroperoxide functionalized rubber compound. An oxygen containing feed stream containing triplet oxygen is supplied to an oxidation reactor of the type described previously. The catalyst bed within the reactor is irradiated with electromagnetic radiation in the ultraviolet or visible light range in order to convert triplet oxygen to singlet oxygen to produce a singlet oxygen enriched gas stream. This gas stream is supplied into a second reactor containing a dispersion of an unsaturated rubber component in a carrier stream. The singlet oxygen is reacted with the rubber component in order to produce a hydroperoxide functionalized rubber component which is recovered from the second reactor. A diffuser such as described previously is employed in order to produce a fine foam of the triplet oxygen enriched gas within the rubbery dispersion. The foam bubbles are relatively small in order to provide a large interfacial area between the gas phase and the rubber liquid phase. In this embodiment, the foam bubbles are 1 cm. or less in diameter, and more specifically, 0.5 cm. or less. Foam bubbles having a maximum average dimension of 1 milliliter provide for a very effective interfacial area between the gas phase and the rubber liquid phase in the heterogeneous reaction mode.

DETAILED DESCRIPTION OF THE INVENTION

Figure 1:
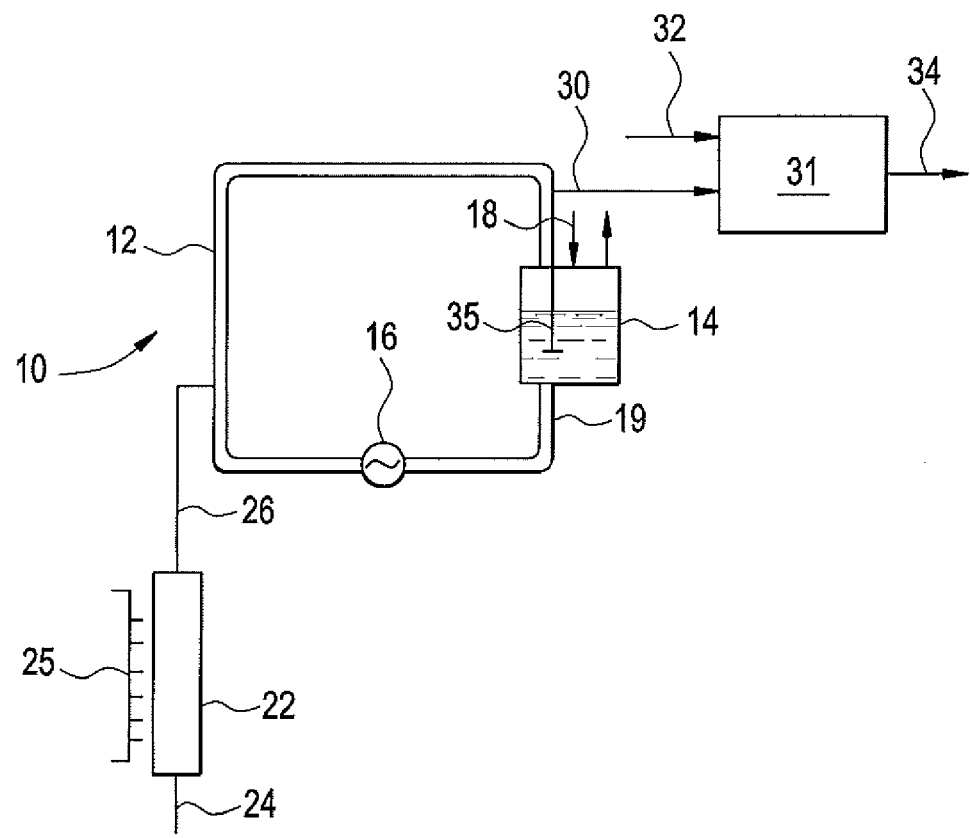
FIG. 1 is a schematic illustration of a reactor system for carrying out the present invention.

The present invention involves the use of a photosensitive dye and a light source in the presence of oxygen to produce singlet oxygen to create hydroperoxide groups on unsaturated rubber polymers. Conversions of this general nature are disclosed in U.S. Pat. No. 5,075,347 to Platt et al and published patent application 2006/0276561 A1 to Reimers et al. In Platt et al, steps are taken to dissolve the photoreductant in a feed solution of the polymer, with or without the presence of one or more monomers which may be copolymerized with the rubbery polymer. In Reimers et al a different type of procedure is employed involving a photoreductant dye which is supported on a particulate substrate, and thus is fixed with respect to the process streams of the rubber component and a gaseous oxidizing agent. Thus, the photoreductant dye is not consumed in the process, but instead is continuously regenerated as singlet oxygen is produced and moves on through the catalyst bed. Both of the processes involve a homogeneous reaction mode in which the triplet oxygen is converted to singlet oxygen in the presence of the dispersion of the rubber compound in the carrier solvent. The present invention employs a heterogeneous mode of operation in which an oxygen containing gas which has been enriched in singlet oxygen by the conversion of triplet oxygen, it is introduced into the rubber dispersion in order to provide effective surface area content between the singlet oxygen and the rubber molecules which are functionalized to include hydroperoxides.

The rubbery polymers which can be employed in carrying out the present invention include various unsaturated rubber polymers which are well known to those skilled in the art, such as polybutadiene and other diene rubbers, EPDM terpolymer rubber and polyisoprene. Such rubbers are disclosed in the aforementioned patent to Platt et al and published application to Reimers et al. As disclosed there, examples of suitable diene rubbers include mixtures of one or more conjugated 1,3-dienes, such as butadiene, isoprene, piperylene and chloroprene. Such rubbers can take the form of homopolymers of conjugated 1,3-dienes and interpolymers of conjugated 1,3-dienes with one or more copolymerizable monoethylenically unsaturated monomers, e.g., copolymers of isobutylene and isoprene. The rubbery polymer can take the form of a terpolymer of two different alpha-olefin monomers and a non-conjugated diolefin monomer. One alpha-olefin monomer can have from 2 to 4 carbon atoms and the other alpha-olefin monomer from 3 to 16 carbon atoms, with the number of carbon atoms in the one monomer being different than the number of carbon atoms in the other alpha-olefin monomer. Exemplary of such terpolymers are terpolymers of ethylene, propylene and a non-conjugated diolefin monomer (e.g., 5-ethylidene-2-norbornene). Such terpolymers are generally known in the art as EPDM rubbers. As noted previously, the rubbery polymer can be a homopolymer of 1,3-butadiene.

As disclosed in the Platt et al. and Reimers et al references, once the hydroperoxide functionalized rubber compounds are produced, they may be reacted with free radical polymerizable monomers to form side chains on the peroxide functionalized rubber backbone. Examples of suitable monomers which can be copolymerized with the rubbery compound include the monovinylidene aromatic hydrocarbons (e.g., styrene, aralkylstyrene, such as the o-, m- and p-methylstyrenes, 2,4-dimethylstyrene, the ar-ethylstyrenes, p-butylstyrene, etc.; and alpha-alkylstyrene, such as alpha-methylstyrene, alpha-ethylstyrene, alpha-methyl-p-methylstyrene, etc.; vinylnaphthalene, etc.); ar-halo-monovinylidene aromatic hydrocarbons (e.g., o-, m- and p-chlorostyrenes, 2,4-dibromostyrene, 2-methyl-4-chlorostyrene, etc.); acrylonitrile, methacrylonitrile, alkyl acrylates (e.g., methylacrylate, butyl acrylate, ethylhexyl acrylate, etc.), the corresponding alkyl methacrylates, acrylamides, (e.g., acrylamide, methylacrylamide, N-butylacrylamide, etc.); unsaturated ketones (e.g., vinyl methyl ketone, methyl isopropenyl ketone, etc.); alpha-olefins (e.g., ethylene, propylene, etc.); vinyl esters (e.g., vinyl acetate, vinyl stearate, etc.); vinyl and vinylidene halides (e.g., the vinyl and vinylidene chlorides, and bromides, etc.); and the like. The monomers can be copolymerized with the rubbery component in the course of oxygenating the rubber containing dispersion as it flows through the catalyst bed. In this case, the unsaturated rubber component in the carrier solvent will also include a monomer component so that copolymerization occurs as the rubber component is functionalized by the singlet oxygen in the nitrogenous oxidation reaction. More usually, the oxygenated rubber component can be recovered from the reactor and then applied to a polymerization zone where it reacted with one or more monomers to form the desired copolymers.

Suitable photoreductant dyes which can be employed as catalysts in the present invention include acridine, methylene blue, rose bengal, tetraphenylporphine, A protoporphyrin, A phthalocyanine and eosin-y and erythrosin-b. For a further description of processes for the hydroperoxide functionalization of rubber polymers and the various rubbery polymers, monomers and photoreductant components which may be employed in carrying out the present invention, references is made to the aforementioned U.S. Pat. No. 5,075,347 to Platt et al., and Patent Application Publication No. 2006/0276561 to Reimer et al, the entire disclosures of which are incorporated herein by reference.

The substrate material containing the photosensitized catalyst component may be of any suitable type so long as it is inert in the environment in which the triplet oxygen is converted to singlet oxygen. Typically, the particulate support material will take the form of an inorganic material, such as alumina or silica. Round silica beads are particularly effective in the present invention. The support particles typically will have an average particle size within the range of 0.1-0.8 cm and more specifically a particle size within the range of 0.2-0.5 cm to provide a catalyst bed of relatively uniform size distribution. The photosensitized catalyst component may be supported on the particulate substrate component in any suitable amount. Normally the photosensitized catalyst component will be present in an amount within the range of 0.015-15 milligrams of photosensitive catalyst component per gram of substrate material. A more specific distribution of photosensitized catalyst component is within the range of 0.03-10 milligrams of photosensitized catalyzed component per gram of substrate material.

Turning now to the drawings, there is illustrated in FIG. 1 a schematic diagram of a suitable photohydroperoxation reaction system which may be employed in carrying out the present invention. As shown in FIG. 1, a loop type reactor 10 comprises a circulation loop 12 to which rubber is supplied from a rubber feed chamber 14 and circulated through the loop 12 by a pump 16 and back to the rubber feed chamber. The reactor 12 may be of any suitable type. It may be a packed reactor containing a particulate material with so-called "bubble flow" through the reactor, or the reactor may contain no material other than the solution flowing through the reactor. It also may be a so-called "trickle bed" reactor. For a further description of such reactors as may be employed in carrying out the present invention, reference is made to Hoffman, H. Hydrodynamics and Mass Transfer in Bubble Columns in Multiphase Chemical Reactors, Ed. Gianetto A., Silverston P. L., Springer-Verlag, 1986, p. 434. The rubber feed chamber is supplied with a feed of a rubbery polymer, such as polybutadiene, in a carrier solvent such as styrene. The rubber feed is continuously supplied to the chamber 14 via line 18 and withdrawn from the chamber via line 19. A photo oxidation reactor 22 comprising one or more catalysts beds of a light induced photosensitized catalyst component supported on a permeable catalyst support is associated with reactor 10. A stream of air or other gas containing triplet oxygen is introduced into the photooxidation reactor via line 24. The photooxidation reactor is irradiated with a source of light energy 25 through a transparent wall section in the photooxidation reactor. The irradiation in the presence of the photooxidation catalyst results in a portion of the oxygen present in the gas stream being converted from triplet oxygen to a singlet oxygen spin state. The stream containing the photo-chemically excited air is withdrawn from the photo-oxidation unit 22 and supplied through line 26 to the rubber dispersion flowing through the reactor loop 12. As described in greater detail below, the singlet oxygen containing gas stream is introduced into reactor 12 by means of a sparger system in order to produce a fine foam of air bubbles within the circulating dispersion of rubber material. A portion of the functionalized rubber solution is withdrawn from reactor 12 via line 30 and passed to a suitable utilization stage 31, such as a polymerization reactor. In stage 31 the functionalized rubber, e.g. functionalized polybutadiene, is reacted with a co-monomer such as styrene supplied through line 32. The output from polymerization reactor 31, e.g. high-impact polystyrene, is then withdrawn through line 34 for further processing.

The remaining polybutadiene dispersion being circulated through the tubular reactor 12 is introduced into the rubber supply chamber 14 through a tube 35 which is immersed in the rubber dispersion and has an outlet near the bottom of the tank. The rubber dispersion along with freshly supplied rubber dispersion supplied through line 18 is then withdrawn via line 19 and re-circulated through the loop type reactor 12.

Figure 2:
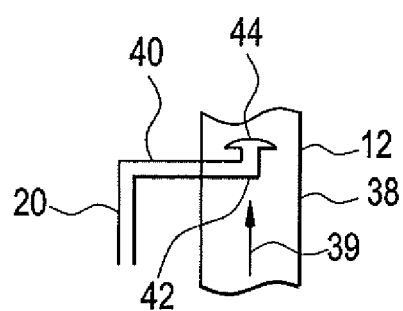
FIG. 2 is a schematic illustration of a diffuser tube for introducing an oxygenating gas into a loop type reactor.

The rubber dispersion circulated through reactor 12 is relatively viscous, normally having a viscosity within the range of 800-2100 centipoise (cp) and more usually within the range of 1500-2000 cp. This relatively viscous rubber solution is susceptible to the formation of a foam of the singlet oxygen enriched gas as it enters the reactor from the photooxidation unit via line 26. In order to facilitate foam production, the gas introduced from the photo oxidation unit may be supplied to the loop reactor 12 through one or more gas diffusers. This embodiment of the invention is illustrated in FIG. 2 in which the section 38 of the tubular reactor 12 is shown fitted with a gas diffusion unit 40 connected to line 26. The direction of flow through the reactor is indicated by arrow 39. As indicated, the gas diffuser tube 40 is positioned near the center line of the tubular reactor and comprises an elbow section 42 equipped with a sparger head 44. Sparger head 44 is an enlarged head having a porous area providing a plurality of openings through which the oxygen enriched gas stream enters the liquid flowing through the reactor. The sparger head may be configured depending upon the desired size of the foam bubbles within the dispersion and the viscosity of the dispersion. For example, for a circulating rubber dispersion having a viscosity of about 50 cp the sparger head may have a cross sectional diffusion surface of a diameter of about 3 cm through which gas can enter into the rubber dispersion. Suitable spargers which may be employed in carrying out the invention are available from Mott Corporation, Farmington, Conn., under the designation as GSD Series Porous Metal Centering Ring Diffusers. As indicated previously, the gas bubbles in the foam introduced into the circulating rubber-solvent medium can be characterized as a foam having a bubble dimension of about 0.5 cm. or less.

Figure 3:
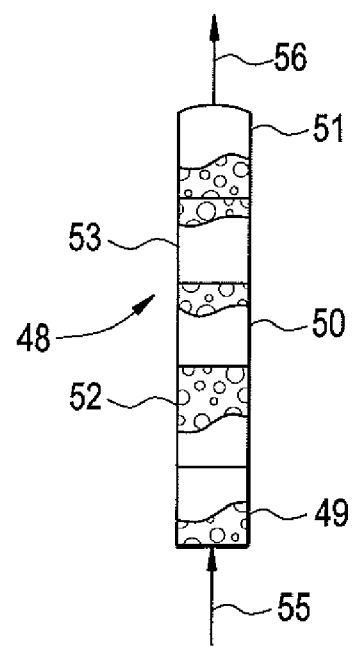
FIG. 3 is a side elevation with parts broken away of a further oxidation tube involving alternating sections of supported catalyst and transparent beads.

As noted previously, the photooxidation reactor comprises one or more elongated tubes having a transparent wall section. In an example of the invention, a glass photooxidation column having a length of 44" and an inner diameter of 2" may be employed. The glass column is packed alternatively with sections of 1 cm diameter glass beads interspaced with sections of particles of a supported photo catalyst. The supported photo catalyst and glass beads are alternatively arranged in the reactor tube as shown in FIG. 3. FIG. 3 is a side elevation of a reactor tube 48 with parts broken away to disclose sections of catalyst as indicated by reference numerals 49, 50 and 51 on a particulate support such as silica or alumina. Interposed between the catalyst sections are sections of 1 cm. diameter glass beads to provide transparent sections 52 and 53. Oxygen containing gas is introduced into the column 49 through a line 55 at the bottom and flows upwardly through the column and exits via line 56 where it is then supplied to the loop type reactor in which the rubber dispersion is circulated.

Figure 4:
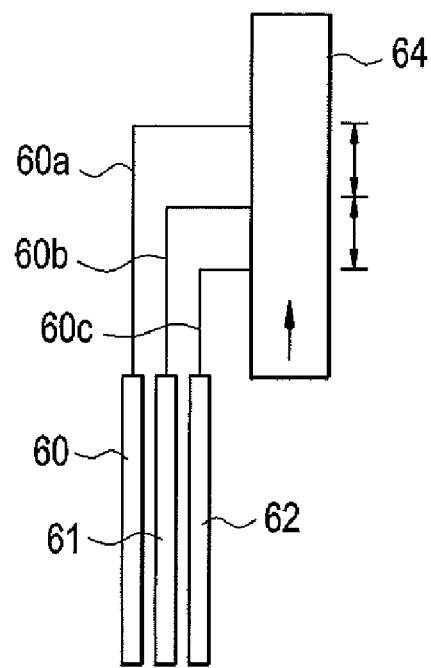
FIG. 4 is a schematic illustration showing a plurality of parallel low fluid oxidation tubes connected to a loop type reactor.

In one embodiment of the invention as illustrated in FIG. 4, the photooxidation unit comprises a plurality of photo tubes, as indicated by reference numerals 60, 61 and 62. The outlet lines 60a, 61a and 62a from the photo oxidation tubes are connected to the loop type reactor (a section of which is indicated by reference numeral 64 in FIG. 4) through diffuser tubes in a spaced orientation along the length of the tubular reactor. For example, the spacing between the diffuser tubes leading into the reactor, as indicated by "i" in FIG. 4, may be about 1-5 cm. This configuration facilitates the formation of an elongated section of foam as the rubber medium flows through the loop type reactor.

Figure 5:
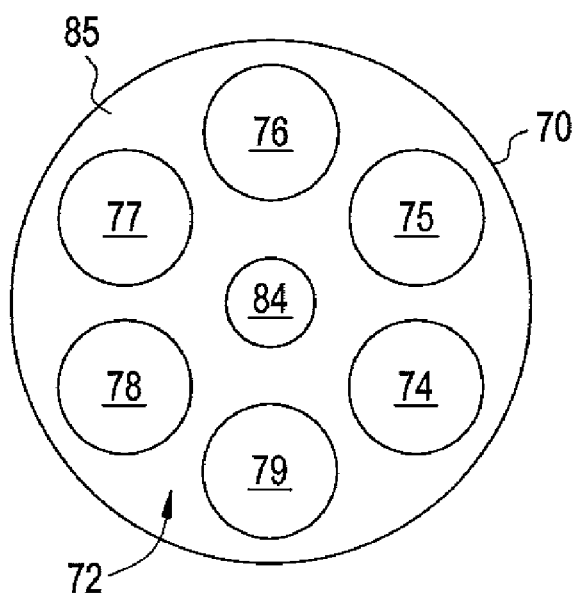
FIG. 5 is a plane view of a plurality of parallel connected reactors arranged in an array surrounding an internal light source.

FIG. 5 is a schematic illustration in plane view of a photooxidation unit comprising a canister 70 supporting a plurality of parallel photo tube reactors spaced laterally from one another to provide a reactor array 72. The reactor array is provided with suitable inlet and outlet manifolding (not shown) for the ingress and outlet of the oxygen containing gas stream through the photo oxidation reactor. An elongated light source 84 is located internally within the array in order to photo-energize the oxygen containing gas flowing through the photo oxidation unit. An outer cylindrical container 70 which supports the photo oxidation tubes 74-79 is provided with a reflective surface on its interior wall in order to concentrate light energy within the photo oxidation unit. For example, a layer of aluminum foil may be disposed on the inner surface 85 of the canister wall.

In experimental work respecting the invention, a pilot reactor system having a configuration of the type disclosed in FIG. 1 was employed to produce a hydroperoxide functionalized rubber in the production of high impact polystyrene (HIPS). The loop type reactor involved was arranged in a rectangular configuration of tubing having an inner diameter of 2-3 inches with the rectangular configuration measuring about 3 meters on the long side of the rectangle and about 1½ meters on the short side of the rectangle. The rubber solution was polybutadiene in a styrene carrier liquid. The photo catalyst employed was an acridine orange base supported on silica support particles. The photooxidation unit corresponding to unit 22, shown in FIG. 1, was composed of six 44" glass tubes. The tubes were connected to the rectangular loop reactor through dispersion systems spaced about 25 inches apart along the length of the reactor. The experimental work showed a number of improvements in hydroperoxide functionalized rubber employing the heterogeneous multiphase reactor system of the type involved in the invention. Improvements in swell index, bends, elongation and izod strength were noted as described in greater detail below. A further improvement observed for the heterogeneous type reactor system of the present invention included the absence of dye leached into the product rubber via deposition on the catalyst surfaces as involved in homogenous reaction systems. The catalyst and supports which can be employed in carrying out the invention are themselves inexpensive and can be readily loaded and removed from the photo oxidation unit.

In the experimental work, two 1,400 pound feed batches containing 8.0 wt % of polybutadiene rubber in styrene were employed in test runs. The feed also contained Irganox 1010 antioxidant (800 ppm) and mineral oil (2.0 wt %). The feed was treated for six hours using the direct air injection hydroperoxidation pilot reactor system described above. In this system, the feed batch was circulated with a pump through the loop and sparged with air activated in the six photo catalyst-packed columns. After air treatment, the feed was returned to the feed tank through the dip-tube. Air pumped with the feed to the bottom of the tank created turbulence that aided agitation and mixing of the feed in the tank. Samples of the peroxidized feed were taken hourly and analyzed for active oxygen in accordance with the procedure of ASTM-D-2340-82. The samples had between 44 and 55 ppm of active oxygen per gram of rubber.

In preparing the supported catalyst, 0.015 g of Acridine Orange Base (FW 265.36, 75% purity, Aldrich) was dissolved in 10 ml. of water acidified with 1 ml. of acetic acid. The resulting clear yellow solution was added to a 200 mL flask of a flask-type sprayer. 100 g of silica support (surface area, 144 mw/g; pore volume 0.89 cc/g) was placed on a round aluminum foil plate in the hood. Compressed air was supplied through the tubing connected to the sprayer. Air was supplied at a low rate that allowed slow spraying of the silica with the dye solution. The silica beads were mixed during spraying so all the beads were covered with the dye. The beads were also shaken periodically to ensure homogeneous distribution of the dye. At the conclusion of the spraying operation, water was removed from the support by placing the plate with the dye-sprayed photo catalyst in a vacuum oven pre-heated to 60° C. and heated overnight.

Each of the six glass photoperoxidation columns (44" in length, inner diameter of 2") was packed with three pounds of 1 cm-diameter glass beads and 1.0 L of the supported photocatalyst described above. The catalyst was loaded in the columns in alternating layers with the clear glass beads in the configuration as shown in FIG. 3 in order to improve irradiation of the entire volume of the photocatalyst inside the column.

The photoperoxidation unit was wrapped with aluminum foil as described above to increase irradiation of the columns. The light intensity was found to range between 10 and 100 ft-candles at various points in the array of phototubes with an average of approximately 30 ft-candles. Air was fed through the packed phototubes at a rate of 30 scf/h. The excited air passed from the column through spargers into a feed of rubber dissolved in styrene monomer. Feed flow through the reactor as observed through the sight glass in the loop had a foamy appearance of finely dispersed air bubbles.

The photoperoxidized feeds described above were employing in the production of HIPS grade material. The result for the peroxidated rubber as compared to those employing untreated rubber under similar production conditions and final product targets (melt flow, tuber particle size, etc.) are set forth in Table I. As shown in the table, significant increases in the ductility (bends, elongation) and impact properties resulted from employing the hydroperoxidized feeds.

TABLE I

| HIPS Grade Property | Peroxidized Rubber | Standard Rubber | Difference % |
|---|---|---|---|
| Melt Flow Index (dg/min | 4.85 | 2.74 | |
| Rubber Content (%) | 7.18 | 6.96 | 3.1 |
| Rubber Particle Size (µ) | 5.73 | 5.51 | |
| Swell Index (%) | 13.01 | 9.77 | 33.2 |
| Bends (number) | 129 | 25 | 416 |
| Elongation (%) | 58.2 | 44.2 | 31.7 |
| Izod Impact-Notched (ft-lbs/in | 2.5 | 1.9 | 31.6 |
| Tensile Modulus | 2.95 | 2.9 | |
| Tensile Strength @ Yield | 3177 | 3330 | |
| Tensile Strength @ Break | 3188 | 3665 | |
| Flexural Modulus | 3.1 | 3.04 | |
| Flexural Strength | 6348 | 7010 | −9.4 |
| Gardener Dart | 91.1 | 86.4 | |
| Gloss, 20 | 12.1 | 15.6 | |
| Gloss, 60 | 41.9 | 50.1 | |
| Swell Index | 13.01 | 9.77 | 33.2 |
| Gel Content | 16.32 | 19.01 | −15.00 |
| Grafting | 127.3 | 173.1 | −25.12 |
| Mineral Oil N|R | 2.48 | 2.13 | 16 |
| Izod/Rubber | .35 | .27 | 27.5 |

Hydroperoxide functionalized rubbers are particularly well suited for the production of high impact polystyrene (HIPS) materials since the decomposition of the —OOH functional group generates rubber based radicals which can initiate styrene polymerization resulting in physical grafting of the polystyrene matrix to the rubber phase. Making these phases more compatible can be advantageous in producing grades with improved rubber utilization as gauged by the impact and elongational resistance of the HIPS materials produced. Increasing the photoperoxidation to extremely high levels can also be exploited in applications where "coreshell" morphologies are sought. Such materials may also be used to replace styrene-butadiene materials used to impart properties to more specialty markets such as HIPS materials that display high gloss retention upon processing. Finally, the presence of —OOH functional groups in the rubber may also lower initiator needs in the process used to maximize rates, lower heating requirements early in the process. The functional groups may also decrease the need for more costly initiators believed to promote grafting that are often used in HIPS processes.

In order to control the degree of hydroperoxidation, various parameters of the photohydroperoxidation system can be easily modified. These include the total exposure time of the rubber feed solution to the excited air as well as airflow rates. Air flow rates and the sparged solution density (i.e., the degree of foaming/air bubble size) can be modified to increase the surface contact between the solution and the excited air to fine-tune the reaction and provide appropriate level of rubber hydroperoxidation indicated by the desired properties of the final HIPS material.

Having described specific embodiments of the present invention, it will be understood that modifications thereof may be suggested to those skilled in the art, and it is intended to cover all such modifications as fall within the scope of the appended claims.

The invention claimed is:

1. A method for the hydroperoxide functionalization of an olefinic feed stream comprising:
   (a) providing an oxidation reactor containing a permeable catalyst bed comprising a light induced photosensitized catalyst component effective for the conversion of triplet oxygen to singlet oxygen, wherein said catalyst is supported on a particulate substrate material forming a permeable catalyst bed;
   (b) supplying an oxygen containing feed stream containing triplet oxygen to said catalyst bed;
   (c) irradiating said catalyst bed while said oxygen containing feed stream is flowing through said catalyst bed with electromagnet radiation in the ultraviolet or visual light range at an intensity sufficient to convert triplet oxygen in said stream to singlet oxygen in the presence of said catalyst to produce a singlet oxygen enriched gas stream;
   (d) supplying said singlet oxygen enriched gas stream into a second reactor containing a solution of an olefinic component having an allylic hydrogen in a carrier solvent;
   (e) contacting said solution with said singlet oxygen enriched gas stream under conditions effective to cause an allylic rearrangement and introduce hydroperoxide functionalization into said olefinic component;
   (f) recovering a hydroperoxide functionalized olefinic component from said second reactor.

2. The method of claim 1 wherein said singlet oxygen enriched gas is introduced into said solution by passing said gas through a gas diffuser immersed in said dispersion within said second reactor.

3. The method of claim 1 wherein said catalyst bed comprises an elongated column having a plurality of spaced catalyst sections of particulate substrate material containing said catalyst component and a plurality of sections of light transparent particles interposed between said catalyst sections.

4. The method of claim 1 wherein said particulate support material containing said photosensitized catalyst component comprises particles having an average particle size within the range of 0.1-0.8 cm.

5. The method of claim 1 wherein said photosensitized catalyst component is supported on said particulate substrate material in an amount within the range of 0.08-10 miligrams of photosensitized catalyst component per gram of substrate material.

6. The method of claim 1 wherein said olefin component comprises a polybutadiene rubber having 1, 2 vinyl groups in a hydrocarbon carrier solvent.

7. The method of claim 1 wherein said oxidation reactor comprises a plurality of elongated columns arranged in parallel with each column comprising a permeable catalyst bed formed of a photosensitized catalyst component.

8. The method of claim 7 wherein singlet oxygen enriched gas is passed from each of said columns through a gas diffuser which is associated with said each of said columns and which is immersed in said solution in said second reactor.

9. A method for the preparation of a hydroperoxide functionalized rubber compound comprising:
   (a) providing an oxidation reactor containing a catalyst bed comprising a light induced photo energized catalyst component effective for the conversion of triplet oxygen to singlet oxygen supported on a particulate substrate material forming a permeable catalyst bed;
   (b) supplying an oxygen containing feed stream containing triplet oxygen to said catalyst bed;
   (c) irradiating said catalyst bed while said oxygen containing feed stream is flowing through said catalyst bed with electromagnet radiation in the ultraviolet or visual light range at an intensity sufficient to convert triplet oxygen in said stream to singlet oxygen in the presence of said catalyst to produce a singlet oxygen enriched gas stream and directing said singlet oxygen enriched gas stream into a second reactor suitable for the preparation of functionalized rubber and containing a solution of an unsaturated rubber component in a carrier solvent;
   (d) contacting said solution with said singlet oxygen enriched gas stream and reacting said singlet oxygen with said rubber component; and
   (e) recovering a hydroperoxide functionalized rubber component from said second reactor.

10. The method of claim 9 wherein said singlet oxygen enriched gas is introduced into said rubber solution by passing said gas through a gas diffuser immersed in said solution in said second reactor.

11. The method of claim 10 wherein said singlet oxygen enriched gas is introduced through said gas diffuser at a rate effective to produce a foam comprising bubbles of said singlet oxygen enriched gas in said rubber solution.

12. The method of claim 11 wherein said bubbles of enriched gas have an average particle size of no more than 1 cm.

13. The method of claim 11 wherein said bubbles of enriched gas have an average particle size of no more than 0.5 cm.

14. The method of claim 9 wherein said second reactor is a loop type reactor.

15. The method of claim 9 wherein said catalyst bed comprises an elongated column having a plurality of spaced catalyst sections of particulate substrate material containing said catalyst component and at least one section of light transparent particles interposed between said catalyst sections to enhance the accessibility of said catalyst component to light.

16. The method of claim 15 further comprising at least three catalyst sections having at least two transparent sections interposed between said catalyst sections.

17. The method of claim 9 wherein said photoenergized catalyst component is supported on said particulate substrate material in an amount within the range of 0.03-10 milligrams of photosensitized catalyst component per gram of substrate material.

18. The method of claim 9 wherein said rubber component comprises a solution of polybutadiene having 1, 2 vinyl groups in a hydrocarbon carrier liquid.

19. The method of claim 18 wherein said carrier liquid comprises styrene.

20. The method of claim 9 wherein said catalyst bed is irradiated with electromagnetic radiation having a wavelength predominately within the 350-800 nanometers region.

21. The method of claim 9 wherein said catalyst bed is irradiated with an illumination intensity within the range of 10-150 foot candles.

22. The method of claim 9 wherein said particulate substrate material comprises an inorganic support selected from the group consisting of silica and alumina particles.

23. The method of claim 22 wherein said inorganic support comprises silica having an average particle size within the range of 0.1-0.8 cm.

24. The method of claim 9 wherein said oxidation reactor contains a plurality of elongated columns arranged in parallel with each column comprising a catalyst bed formed of a light irradiated photosensitized catalyst component.

25. The method of claim 24 wherein singlet oxygen enriched gas is passed from each of said columns through a gas diffuser which is associated with said each of said columns and which is immersed in said solution in said second reactor.

* * * * *